(No Model.) 2 Sheets—Sheet 1.
E. W. WISE.
COMPUTING ATTACHMENT FOR SCALE BEAMS.
No. 532,129. Patented Jan. 8, 1895.
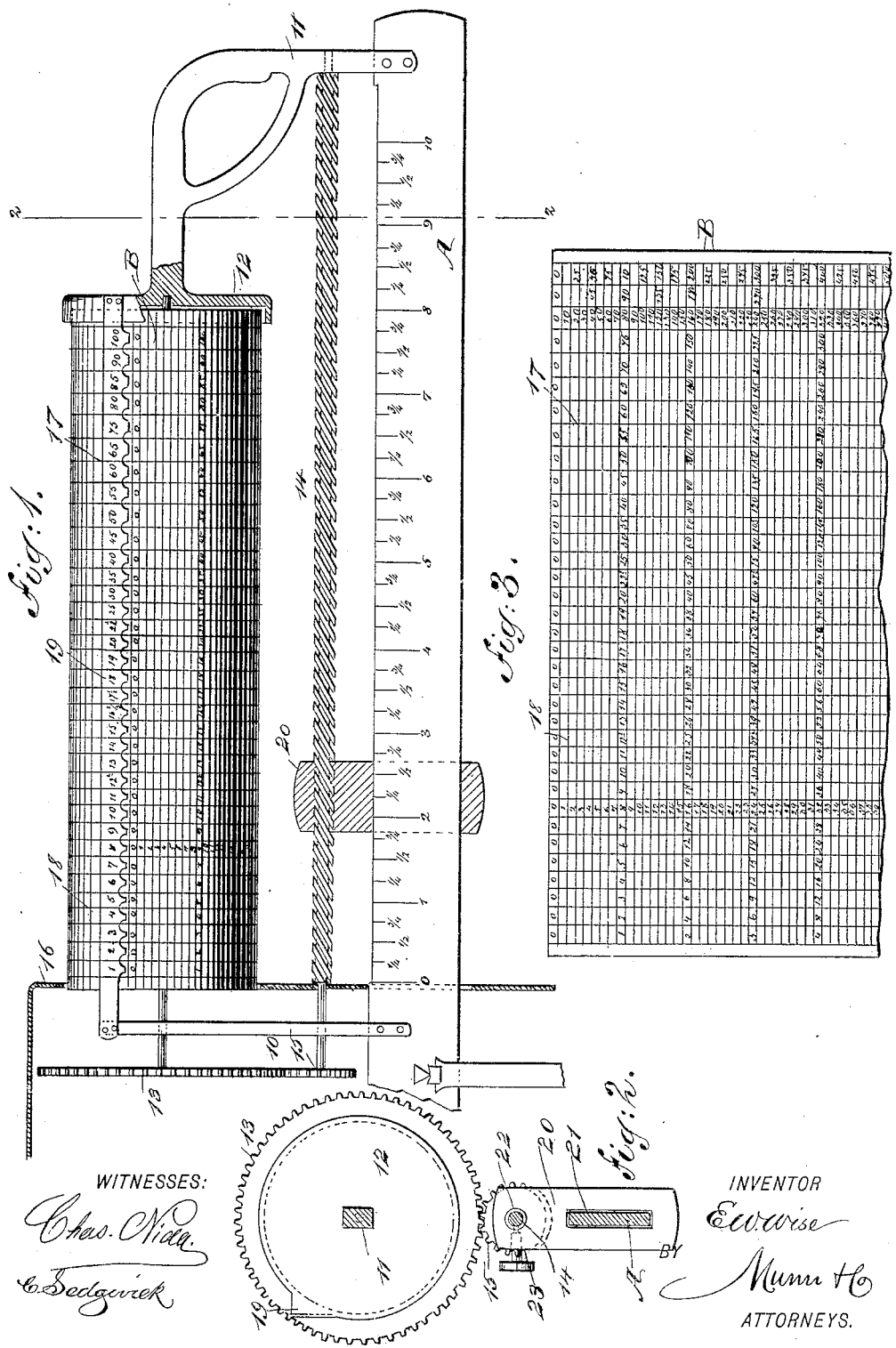

(No Model.)  2 Sheets—Sheet 2.

E. W. WISE.
COMPUTING ATTACHMENT FOR SCALE BEAMS.

No. 532,129. Patented Jan. 8, 1895.

Fig. 4.

| Weight Lbs-Ozs. | 20 | 25 | 30 | 35 | 20 25 | 25 | 30 | 35 |
|---|---|---|---|---|---|---|---|---|
| 2 | 2 | 3 | 4 | 4 | 5 | | | |
| 4 | 5 | 6 | 7 | 9 | 10 | | | |
| 6 | 7 | 9 | 11 | 13 | 15 | | | |
| 8 | 10 | 12 | 15 | 17 | 20 | 10 | | |
| 10 | 12 | 15 | 19 | 22 | 25 | 15 | | |
| 12 | 15 | 19 | 22 | 27 | 30 | 20 | | |
| 14 | 17 | 22 | 26 | 31 | 35 | 25 | 30 | 35 |
| 1-0 | 20 | 25 | 30 | 35 | 40 | 30 | 35 | 40 |
| 1-2 | | | 15 | | | 35 | 40 | 45 |
| 1-4 | | | | 17 | | 40 | 45 | 50 |
| 1-6 | | | | | | 45 | 50 | 55 |
| 1-8 | | | | | | 50 | 55 | 60 |
| 1-10 | | | | | | | 60 | 65 |
| 1-12 | | | | | | | | 70 |
| 1-14 | | | | | | | | |
| 2-0 | | | | | | | | |

WITNESSES:
Chas. Nidla.
C. Sedgwick.

INVENTOR
E. W. Wise
BY Munn & Co.
ATTORNEYS.

UNITED STATES PATENT OFFICE.

EDWARD W. WISE, OF LAS VEGAS, TERRITORY OF NEW MEXICO.

COMPUTING ATTACHMENT FOR SCALE-BEAMS.

SPECIFICATION forming part of Letters Patent No. 532,129, dated January 8, 1895.

Application filed March 5, 1894. Serial No. 502,401. (No model.)

*To all whom it may concern:*

Be it known that I, EDWARD W. WISE, of East Las Vegas, in the county of San Miguel and Territory of New Mexico, have invented a new and Improved Computing Attachment for Scale-Beams, of which the following is a full, clear, and exact description.

My invention relates to a computing attachment for scale beams, and it has for its object to provide such an attachment which will be simple, durable and economic in its construction, and will indicate both the weight and the price, the beam being capable of use in the ordinary manner at any time.

A further object of the invention is to construct the attachment in such a way that the price will be indicated automatically and simultaneously with the operation of weighing, the usual movement of sliding the weight upon the beam causing the work of computation to be performed.

A further object of the invention is to produce an attachment of the above character which may be conveniently applied to any ordinary make of scales.

The invention consists in the novel construction and combination of the several parts, as will be hereinafter fully set forth and pointed out in the claim.

Reference is to be had to the accompanying drawings, forming a part of this specification, in which similar figures and letters of reference indicate corresponding parts in all the views.

Figure 1 is a front elevation of a scale beam having the attachment applied thereto, a portion of the attachment being in section. Fig. 2 is a vertical section through the attachment and the scale beam, said section being taken practically on the line 2—2 of Fig. 1. Fig. 3 is a plan view of a portion of the covering of the computing cylinder, illustrating the arrangement of calculated prices; and Fig. 4 is a view similar to Fig. 3, illustrating a slightly different arrangement of the table.

In carrying out the invention the scale beam A is one of ordinary make, and is provided near its ends with standards 10 and 11. The standard 10, which is attached to the beam near its pivot point, extends vertically upward therefrom, while the opposing standard 11, which is near the outer end of the beam, is more or less angular in construction, one member extending over the beam, and the horizontal member is provided with a flanged disk 12 at its inner end.

The computing cylinder B is journaled in the central portion of the disk 12, and likewise in the standard 10, the trunnion journaling the cylinder in the standard 10 extending beyond said standard, and it has attached to its outer extremity a gear 13.

A screw shaft 14, is located beneath the cylinder, being journaled in the two standards 10 and 11. The shaft extends beyond the standard 10, and is provided at its outer end with a pinion 15 meshing with the gear 13. If in practice it is found desirable a casing 16, may be made to inclose the gears, and inner end of the cylinder, while the disk 12 and its flange will effectually close and conceal the outer end of the cylinder B. This cylinder may be made of any approved material, light sheet metal being usually employed for the purpose; and the face of the cylinder is provided with circumferential lines 17, forming columns, and longitudinal lines 18, crossing the circumferential lines and producing spaces.

A rate indicator 19, is employed in connection with the cylinder, being made to face the front as shown best in Fig. 2. This rate indicator consists of a plate or bar of metal or other material, extending from the flange of the disk 12 longitudinally over the cylinder, preferably at a point between its top and bottom, the opposite end of the plate or bar being secured to the inner standard 10. The rate indicator is provided with columns corresponding to those upon the computing cylinder, and in the columns of the rate indicator the rate in cents or dollars per pound, per ounce, &c., is indicated. In the preferred construction of the rate indicator, pointers are formed at the bottom of each column thereon.

The sliding weight 20 used in connection with the scale beam is provided with the usual opening 21 for the passage of the said beam, and with an upper opening 22, the wall whereof is threaded to receive the screw shaft 14. Thus as the sliding weight is slid along the beam to obtain the proper weight, the shaft 14 is rotated and motion is communicated to the pinion 15 and to the computing cylinder through the medium of its gear 13.

I desire it to be distinctly understood that the columns and spaces may be produced directly upon the computing cylinder, or they may be produced upon paper, fabric, or other material secured upon the cylinder.

In Fig. 3 I have illustrated in plan view a portion of the face of the computing cylinder, and the figures in the spaces represent the computation of various weights of material at given prices, those shown upon the indicator, for example. In this particular scale I have made the circumference of the cylinder ten and one-eighth inches. When the scales are at rest and the weight 20 is in the position indicated at '0' on the scale beam, the various pointers on the rate indicator will point to ciphers located in the columns of the computing cylinder. I have also made the scales to weigh just ten pounds, so I have just one inch of the circumference of the cylinder to represent one pound on the scale beam. By dividing one pound into two ounce spaces just one-eighth of an inch on the cylinder will be obtained for every two ounces in the ten pounds, so the prices are computed to two ounces. The gearing is so made that in moving the sliding weight any given distance on the scale beam the computing cylinder will revolve a corresponding distance at its circumference; that is, if the weight is moved to one pound the cylinder will turn exactly one pound, or in other words, the cylinder would turn eight spaces of two ounces each, or sixteen ounces. The rate per pound is shown on the rate indicator immediately above the column for which said rate was computed, so that when the price of anything is wanted, it is balanced on the scales in the usual manner, and by glancing at the rate for which the article is sold per pound, the amount will be found under the pointer for that column.

The table in Fig. 3 shows only a part of the cylinder unrolled enough to represent four pounds. The whole cylinder unrolled would show the same number of pounds that the beam indicates, which in this example would be ten. The computations should be carried to the nearest unit.

The scales with the attachment attached can be used as an automatic calculator. For example, if the clerk were asked for thirty-five cents' worth of an article that sells for fifty-five cents per pound, the sliding weight could be moved along the scale beam, the party manipulating the weight at the same time fixing his eye on the fifty-five cent column until the amount thirty-five cents comes to the point of the pointer of this column, and the weight would be exactly right. As another example, should it be required to weigh an article, say for instance, a piece of bacon, and it should weigh eight pounds and six ounces and was sold at nineteen cents per pound, the answer would be found at the pointer on the rate indicator, and this would save the time usually required for calculating the amount with a pencil.

In the event that the sliding weight should wear the thread upon the shaft 14, and thereby produce lost motion, said motion can be compensated by passing a set screw 23 through the weight to an engagement with the shaft, as illustrated in Fig. 2.

It will be readily understood that the usual movement in pushing the weight out upon the beam does all the work of computing, and that it requires very little extra exertion to manipulate the weight than on an ordinary scale without the calculating device. The beam and attachment thereto may be made for and used upon any of the ordinary makes of scales. The calculations may be made in multiples of five if desired, as for example, take the price per pound as twenty cents and the amount of space allowed for a pound one inch, then there would be one-fourth of an inch for each five cents' worth in a pound, &c.

The arrangement of the calculating face of the computing cylinder may be changed if desired, as for example, as shown in Fig. 4, in the first column, or that next to the body or frame of the scales. Instead of having prices indicated, an arrangement of weights may be shown, in which event the corresponding column upon the rate indicator will be designated "Weights," "Lbs.," "Ozs."

It is evident that the beam and calculator can be made to weigh and compute any number of pounds desired, and that changes in form, proportion, and the minor details of construction may be resorted to without departing from the principle or sacrificing any of the advantages of this invention.

Having thus described my invention, I claim as new and desire to secure by Letters Patent—

The combination, with a scale beam, standards attached thereto, a computing cylinder journaled between the standards, the surface of which cylinder is arranged in columns bearing computed rates, and a rate indicator extending across the computing cylinder, independent thereof, and provided with columns corresponding to those on the cylinder, and registering therewith, each column on the rate indicator bearing a numeral or numerals indicating given rates, of a weight held to slide upon the scale beam, a screw shaft operated by said weight, and a gear connection between the screw shaft and the computing cylinder, as and for the purpose set forth.

EDWARD W. WISE.

Witnesses:
  P. C. HOGSETT,
  A. D. HIGGINS.